March 26, 1968     R. H. RANDER     3,374,801
SIPHON BREAKING APPARATUS FOR MILK-HANDLING
SYSTEMS AND THE LIKE
Filed July 19, 1965

INVENTOR.
ROBERT H. RANDER
BY
ATTORNEYS 3,374,801
SIPHON BREAKING APPARATUS FOR MILK-
HANDLING SYSTEMS AND THE LIKE
Robert H. Rander, Grand Rapids, Mich., assignor to
Werner Machinery Company, Grand Rapids, Mich.,
a corporation of Michigan
Filed July 19, 1965, Ser. No. 473,149
2 Claims. (Cl. 137—143)

ABSTRACT OF THE DISCLOSURE

A liquid transferring apparatus of the type which has a container with an open top and a throat outlet at the bottom thereof which is connected to a long length of conduit or hose. The conduit or hose is subjected to vacuum so that any liquid poured into the container will be drawn through the conduit. The improvement in this device is means for causing the fluid to be drawn through the pipe at a greater rate and comprises in combination with the above container and conduit a single length of pipe having a passageway throughout its length, the pipe being inserted into the throat of the container outlet so as to provide a supply of atmospheric air at the throat. The pipe is inserted in the throat and rests against the top edge of the container and it can be readily inserted or removed at will so as not to interfere with a valve within the container which shuts off the throat when the liquid within the container is exhausted.

---

Figure 1:
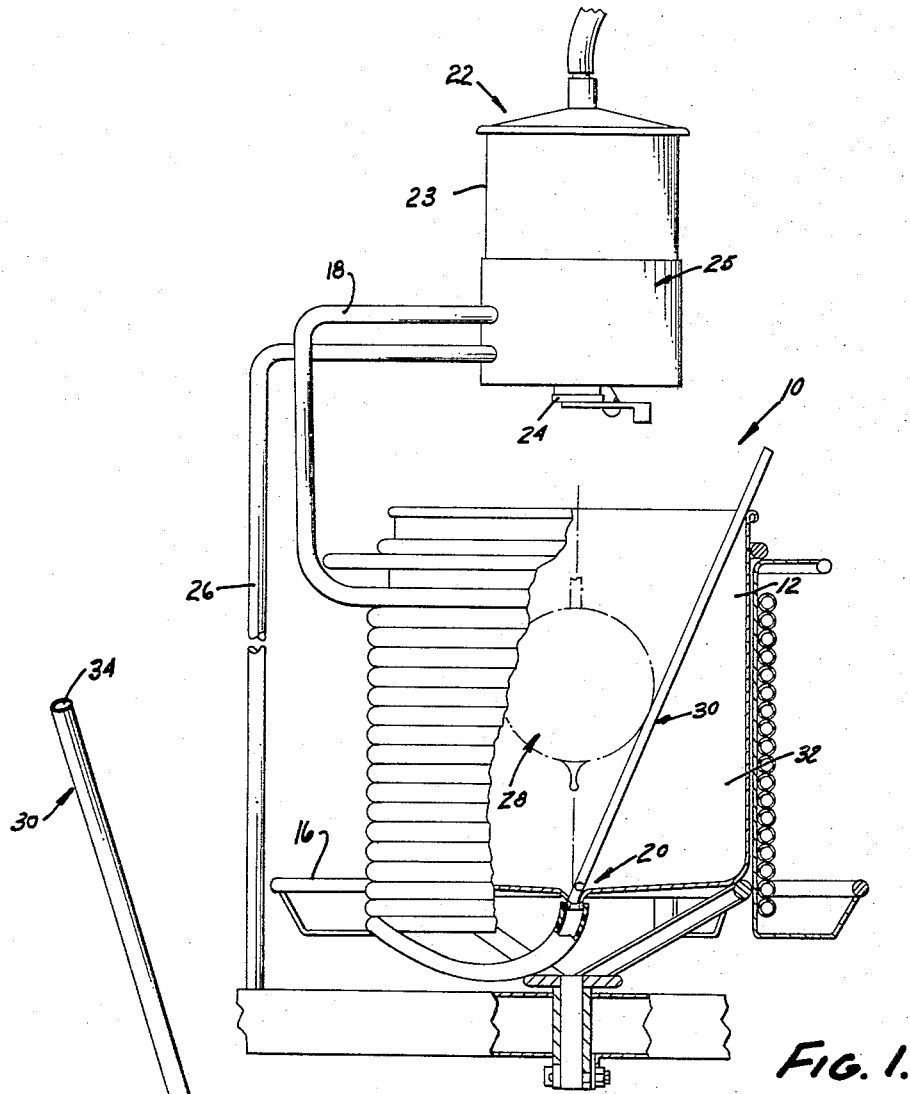

This invention relates generally to fluid-transferring systems of the type which utilize differential pressures to move fluid from a container through a conduit means, and the invention relates more particularly to a milk-transferring system of this nature and to the cleaning thereof after the milk transfer has been completed.

In U.S. Patents Nos. 3,088,483 and 3,144,041, issued May 7, 1963, and Aug. 11, 1964, and assigned to the assignee of the present application, an apparatus for handling milk is disclosed which basically utilizes a relatively large, upright container having a long length of hose connected to the bottom thereof and a vacuum-type pump and releaser apparatus coupled to the remaining end of the hose, of the type specifically disclosed in U.S. Patent No. 3,008,450, also assigned to the assignee of the present invention. This arrangement is such that immediately after milking the milk may be poured into the container, and the vacuum in the releaser will then draw the milk through the long hose to a remote milk house, where the milk is dumped into desired containers for storage or shipping.

Equipment of this nature must necessarily be cleaned after each usage, and this is accomplished by positioning the releaser mechanism over the container so that it will dump fluid thereinto, pouring a cleaning solution into the container, and then circulating the cleaning solution through the hose, releaser, and back through the container. However, the requirements for moving the cleaning solution through the hose are quite different from those for moving milk therethrough. In transferring, all that is required is a steady, smooth flow, whose capacity may be large but whose actual velocity may be relatively slow, so as not to unduly agitate and churn the milk. In cleaning the equipment, the cleaning solution should be moved out of the container and through the hose as swiftly as possible, preferably in the form of slugs of cleaning fluid, with as great a degree of turbulence as is possible, so that the cleaning solution more effectively dislodges the milky substances clinging to the interior of the equipment. It is clearly undesirable to have to change the circulating apparatus or make any structural alterations to the equipment merely in order to perform the frequent cleaning operations. It is also undesirable to practice any cleaning method requiring the expenditure of time and effort on the part of the individual dairyman, since the purpose of the milk handling apparatus is to provide automated equipment.

Accordingly, it is a major object of the present invention to provide a relatively simple and very economical means for use with existing fluid-transferring apparatus of the aforementioned type, which will greatly increase the speed of movement of fluid therethrough in instances where this is desired, such as cleaning, and which may be quickly and easily disengaged so that the apparatus operates in its usual manner at other desired times. The inventive apparatus further acts to percolate and divide the cleaning liquid into slugs which circulate through the conduit or hose at a much greater speed because of the lesser volume and weight flow of liquid, to thereby further facilitate the cleansing effect which the swiftly-moving liquid has upon the interior portions of the fluid-transferring apparatus.

The foregoing major objects of the invention, together with numerous other objects and desirable advantages made possible thereby, will become increasingly apparent following a consideration of the ensuing specification and its appended claims, particularly when taken in conjunction with the accompanying illustrative drawings setting forth a preferred embodiment of the invention, as shown in a specific illustrative environment.

Figure 2:
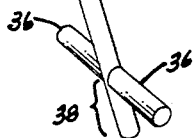

In the drawings:

FIG. 1 is a fragmentary side elevation, partially in section, illustrating a typical fluid-transferring apparatus for use with the novel cleaning apparatus; and FIG. 2 is an enlarged, frontal perspective view of the cleaning apparatus itself.

Briefly stated, the present invention provides an apparatus for agitating and increasing the speed of movement of fluids through fluid-transferring apparatus of the type utilizing differential pressures to move fluid from a container through a conduit means connected to the container. The apparatus includes an elongated structure defining at least one generally open passage therethrough. This structure is placed within the container, such that one end of the passage is in proximity with the inner juncture of the container and conduit means, and the structure has a length sufficient to extend beyond the highest level of liquid normally present in the container. The upper end of the structure is arranged to communicate with the atmosphere (the higher pressure of the differential) which injects slugs of air into the fluid as it passes out of the container and through the conduit. When these slugs of air are so introduced, they act to turbulate the liquid and to greatly increase its speed of movement through the conduit. Further, the inventive structure includes means near its lower end for maintaining the structure in a desired position relative to the juncture of the container and conduit, so that the structure need merely be inserted initially in the desired manner and then requires no further attention until it is to be removed, after the cleaning operation is completed and the transfer equipment is to be used once again.

Referring now in more detail to the drawings, in FIG. 1 a typical environmental fluid-handling apparatus is seen at 10. This includes a relatively large upright tank or container 12 into which the fluid is poured as it is collected, the container 12 preferably having a removable cover (not shown) for preventing dirt and foreign substances from entering the interior of the container while admitting atmospheric pressure thereinto nonetheless. As the figure illustrates, the container 12 may include a reel means 16 formed about its outer periphery, upon which may be wound a considerable length of fluid-transferring conduit means 18, all of which is disclosed in the above-mentioned U. S. Patent Nos. 3,088,483 and 3,144,041.

The conduit means 18 is connected to the bottom of the container 12 to form a generally open throat connection 20, through which the liquid within the container may move. The remote end of the conduit means 18 is coupled to a suitable releaser mechanism 22, of the type disclosed in detail in Patent No. 3,008,450. Basically, this is a vaccum-releaser apparatus having a tank 23 which is intermittantly placed under vacuum and then atmospheric conditions, so that the fluid in the container 12 is drawn by the vacuum through the throat 20 and conduit means 18 into the tank 23 of the releaser mechanism 22. When the releaser mechanism is under atmospheric conditions, the fluid is dumped out of a discharge port 24 provided in the bottom of the mechanism 22. The releaser mechanism is supported within a receptacle 25, which is mounted atop a support column 26 so that by rotating the column 26 the releaser tank 23 may be swung over or away from the main container 12.

As the figure indicates, a float valve mechanism 28 is preferably included within the container 12. The valve portion thereof is positioned in alignment with the throat 20 and the float moves with the level of fluid within the container to seal off the throat when the fluid has been completely transferred out of it.

The novel apparatus of the present invention for facilitating the cleaning of the fluid transfer apparatus 10 by speeding the movement of fluid therethrough is indicated at 30. It will be seen that this is basically an elongate structure, whose lower end is positioned in proximity with, and partially within, the throat 20. The device 30 should be long enough so that its upper end is positioned well above the exemplary normal level of cleaning fluid or the like 32 shown within the container 12. Consequently, it will be apparent that the upper end of the apparatus 30 may be exposed to the same pressure, atmospheric or otherwise, as the portion of the interior of the container which does not contain liquid.

The most preferred embodiment of the apparatus 30 is shown in detail in FIG. 2. It is here seen that this is basically an elongate tube structure, having an open passage 34 threthrough. It is to be noted that near the lower end of the apparatus a pair of cross-pieces 36 are secured thereto, preferably a brief distance 38 above the end extremity of the tube. The purpose of the cross-pieces 36 is to rest upon the edges of the throat connection 20 at the bottom of the container 12, and thereby position the protruding lower end 38 of the tube 30 directly within the throat 20. Thus, proper orientation of the tubular structure is maintained regardless of the movement of the fluid from the container, and regardless of movements of the tubular structure itself caused by the movements of the fluid round about it.

In operation, milk or other fluid is collected from various sources and transferred into the container 12. It is then drawn from the container through the throat 20 and the conduit means 18, to pass through the releaser mechanism 22 and be dumped out of its discharge port 24 into desired storage containers or other such vessels located at a distance from the container 12, where the releaser mechanism has been moved. When the entire transfer operation has been completed, the releaser mechanism is returned to its support receptacle 25, which is rotated to position the discharge 24 directly over the top of the container 12. A quantity of a desired cleaning solution 32 is then poured into the container 12. This acts to lift the float mechanism 28 therein, thereby opening the throat 20.

The elongate cleaning apparatus 30 of the invention is then placed inside the container 12, such that its protruding portion 38 engages the throat 20, with the cross-pieces 36 resting upon the lateral edges of the throat. This instantly acts to feed air at atmospheric pressure (which is the higher pressure of the differential acting to move fluid through the conduit means) from the upper extremities of the container 12 directly into the throat 20. Instantly the flow of cleaning solution 32 through the throat and conduit means 18 is greatly increased. This is thought to be due to several factors, including the sudden increase in the actual differential pressure between the throat 20 and the pump mechanism 22, and also the diminished weight-rate flow of fluid past the throat caused by the introduction of air into the fluid at this point. Further, a considerable turbulation and agitation of the cleaning solution occurs as it passes through the throat and the conduit means, due to the air introduced therein and the increased speed of fluid flow resulting therefrom. As a result, the cleaning effect of the solution 32 is greatly enhanced and, whereas previously a considerable length of time was required for the slow-moving solution to perform an adequate cleaning, by means of the present invention only a relatively short period of exposure to the swiftly-moving turbulent solution is usually more than enough to leave the equipment in excellent condition for future use.

In view of the foregoing description of a preferred embodiment of the novel cleaning apparatus, together with the description of the operation thereof, it will be quite apparent to those skilled in the pertinent arts that the invention provides a most efficacious solution of a long-standing problem in this field. The very simplicity of the apparatus adds to its inventive quality, since it is very easy to fabricate and consequently economical to purchase, it requires no maintenance and is not subject to damage regardles of the extent of usage, it is exceedingly simple to operate and may be inserted and withdrawn in only an instant of time and whenever desired, and needs no attention whatever once it has been inserted and the cleaning cycle is under way. While I have shown the embodiment of the invention which I find most preferable at the present time, it will be clear that other equivalent embodiments are possible, as well as specific variations and modifications in the structure which I have shown. Consequently, all such further embodiments, variations, and modifications as incorporate the spirit of the invention are to be considered as included in the scope of the claims appended herebelow, unless these claims by their language specifically state otherwise.

I claim:

1. In a liquid transferring apparatus of the type having a container which is open at the top for reception of liquid and thereby exposed to atmospheric pressures, a conduit means connected thereto by a suitable throat connection located at the bottom thereof and which utilizes a vacuum applied to such conduit means for moving liquid from the container through the throat and conduit means, and a float valve closing said throat when the supply of liquid is exhausted, the improvement comprising: an elongated tube defining an open passage within its entire length; said tube having one end arranged to at least partially enter said throat; said tube being of a length to span the distance from said open top to said throat to thereby rest against a side of said container and extend beyond the highest level of fluid normally within said container when said one end is entered into said throat, such that said passage is exposed to said atmospheric pressure to feed the same directly into said throat, thereby speeding the movement of said fluid therethrough into and through said conduit means; and means associated with said throat end of said tube for maintaining the end in a predetermined position relative to said throat when entered thereinto; said tube being a separate and removable element so as not to interfere with the operation of said float valve when the supply of liquid is exhausted.

2. The apparatus of claim 1, wherein said means associated with the throat end of said tube includes a cross-piece secured to the tube near such end, said cross-piece extending laterally of the tube to lie across said throat to preclude further entry of said tube thereinto.

References Cited

UNITED STATES PATENTS

| | | | |
|---|---|---|---|
| 1,698,127 | 1/1929 | Engstrand | 103—236 |
| 2,331,463 | 10/1943 | Elliott | 137—143 X |
| 2,733,667 | 2/1956 | Hill | 103—236 |
| 2,786,445 | 3/1957 | Golay | 119—14.07 |
| 2,851,193 | 9/1958 | Hobson | 137—143 X |
| 2,888,028 | 5/1959 | Hill | 137—241 X |
| 3,088,483 | 5/1963 | Brunson | 137—355.12 |

CLARENCE R. GORDON, Primary Examiner.